United States Patent [19]

Dash et al.

[11] 4,034,983

[45] July 12, 1977

[54] ELECTRONIC GAMES

[75] Inventors: Glen R. Dash, Watertown; David J. Agans; Gabor L. Szakacs, both of Boston, all of Mass.

[73] Assignee: Massachusetts Institute of Technology, Cambridge, Mass.

[21] Appl. No.: 640,105

[22] Filed: Dec. 11, 1975

[51] Int. Cl.² ............ A63F 7/06; G08B 5/22; H04N 7/18
[52] U.S. Cl. ............ 273/85 R; 273/DIG. 28; 340/324 AD
[58] Field of Search .......... 273/1 E, 85 R, DIG. 28; 179/2 TV; 235/42 GA; 340/323 R, 324 A, 324 AD; 35/10.2, 12 N, 25

[56] References Cited

U.S. PATENT DOCUMENTS

| | | | |
|---|---|---|---|
| 3,659,285 | 4/1972 | Baer et al. | 273/85 R X |
| 3,778,058 | 12/1973 | Rausch | 273/85 R |
| 3,793,483 | 2/1974 | Bushnell | 340/324 AD X |
| 3,829,095 | 8/1974 | Baer | 273/101.1 |
| 3,874,669 | 4/1975 | Ariano et al. | 273/85 R |
| 3,921,161 | 11/1975 | Baer | 340/324 AD |

Primary Examiner—Anton O. Oechsle
Assistant Examiner—Vance Y. Hum
Attorney, Agent, or Firm—Arthur A. Smith, Jr.; Robert Shaw; Martin M. Santa

[57] ABSTRACT

An electronic game wherein an electronic controller, connected to introduce RF signals through the antenna circuit of a television receiver, introduces to the receiver electric signals that produce on the screen thereof the simulation of at least part of a playing area and the simulation of active parts or components of a game.

49 Claims, 20 Drawing Figures

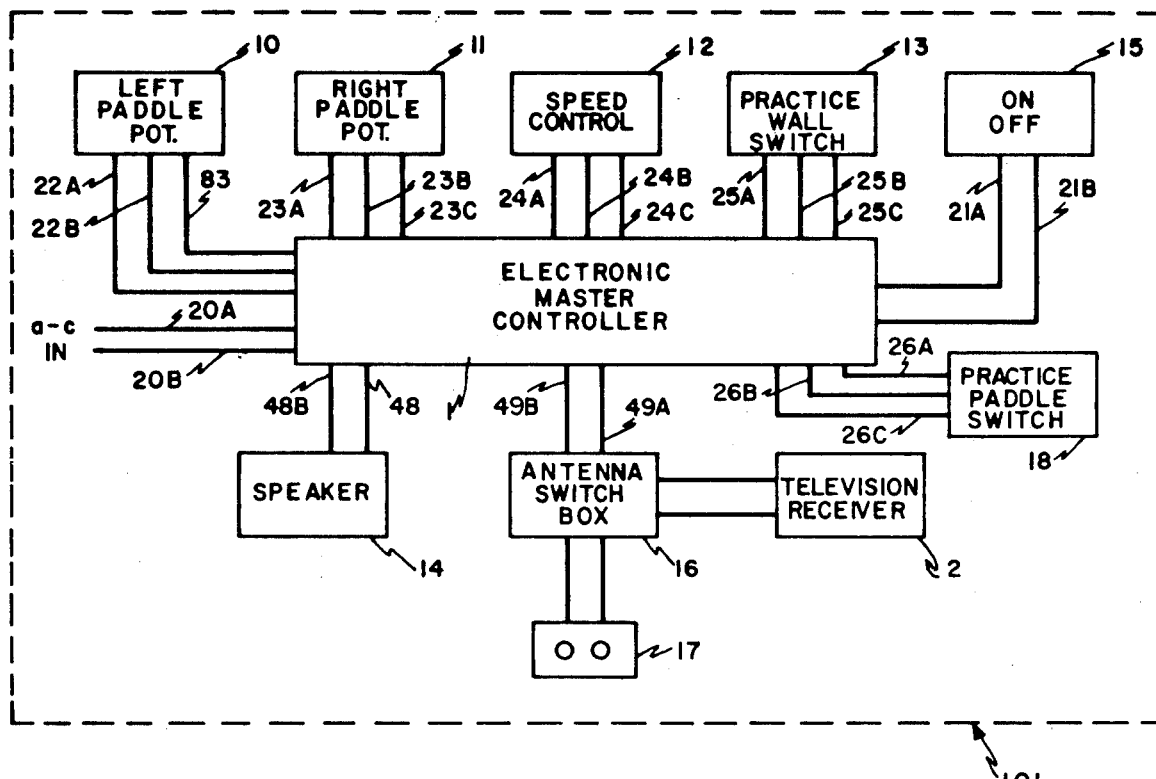

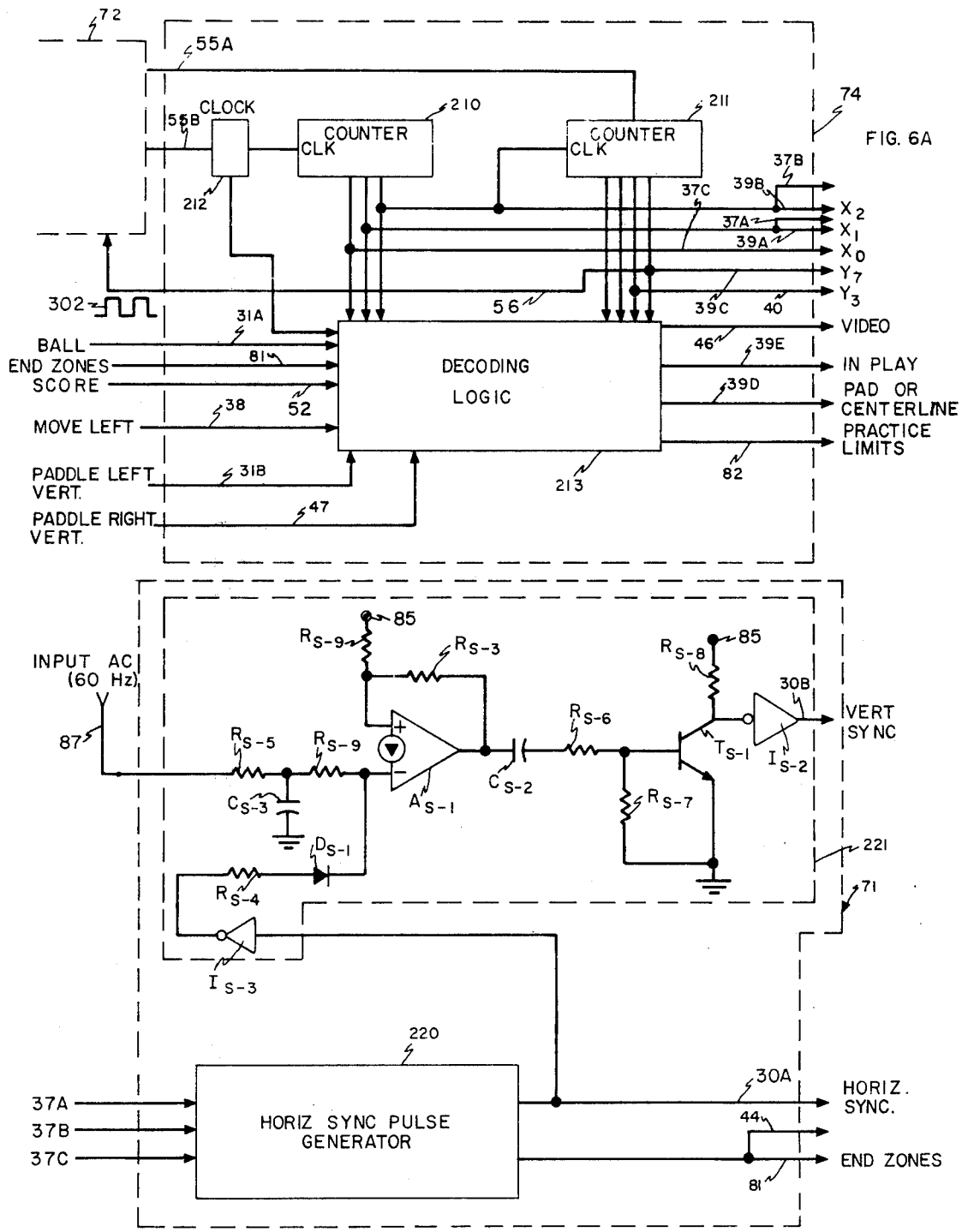

ELECTRONIC GAMES

The present invention relates to electronic games wherein an electronic controller serves to provide programmed game components on the screen of a television receiver.

Electric games employing controllers to introduce the simulation of components of a game on the screen of a television receiver have been proposed. In general, such games have not electrically produced all the components but have had to resort to mechanical attachments and the like.

Accordingly, it is an object of the present invention to provide an electronic game or playing apparatus wherein all the components of the game, active and passive, are produced on the screen of a television under the direction of an electronic controller.

Another object is to provide a less complicated electronic game, both in terms of structure and use, than has heretofore been available.

Still another object is to provide an electronic game that is easier to make and, hence, less costly to make.

A further object is to provide an electronic game with an aesthetic display in such game by utilizing digital circuitry to give clear, precise, passive components of the game and analog circuitry to give smooth movement of active components thereof, the passive components being a play area, etc., and the active elements being simulated paddles and a simulated ball.

A still further object is to provide an electronic game that also includes a practice wall as one of the active elements.

A still further object is to provide an electronic game wherein one simulated paddle and the practice wall can be programmed to play automatically for store shelf display purposes.

These and still further objects are discussed hereinafter and are delineated in the appended claims.

The foregoing objects are achieved in playing apparatus wherein electronic control means introduces electric signals to a television receiver to produce on the screen of the television receiver the simulation of at least part of a playing area or other passive components of a game and the simulation of the active components of the game. The electronic control means or master controller includes in its electronic circuitry two interacting circuits: an analog mapping circuit and a digital mapping circuit that provide an analog map and a digital map, respectively, each of which maps bears a time-phase relationship to the television receiver raster-scan beam. The two mapping circuits act together to reset the television receiver raster scan beam at appropriate times and control the beam intensity, thereby to produce the game components, some of the components being produced by an electric signal from one such map, some by a signal from the other map, and some by a signal from both.

The invention is hereinafter described with reference to the accompanying drawing in which:

FIG. 1 is a representation, block diagram in form, showing a system of the present invention, that includes a conventional television receiver and an electronic master controller to control the electron beam of the receiver cathode ray tube (CRT);

FIG. 2A shows the image screen of the television receiver of FIG. 1 with active and passive simulated components of a game that is played on the screen, two of said components being simulated paddles;

FIG. 2B is a view similar to FIG. 2A but showing a modification of the game elements of FIG. 2A;

FIG. 3 is an enlarged view of one of the paddles of FIG. 2A;

FIG. 6A shows in greater detail, but in block diagram form, the digital mapping circuit shown in block diagram form in FIG. 4;

FIG. 7A shows, schematically, and partly in block diagram form, the sync pulse generator shown in block diagram form in FIG. 4;

Figure 4:
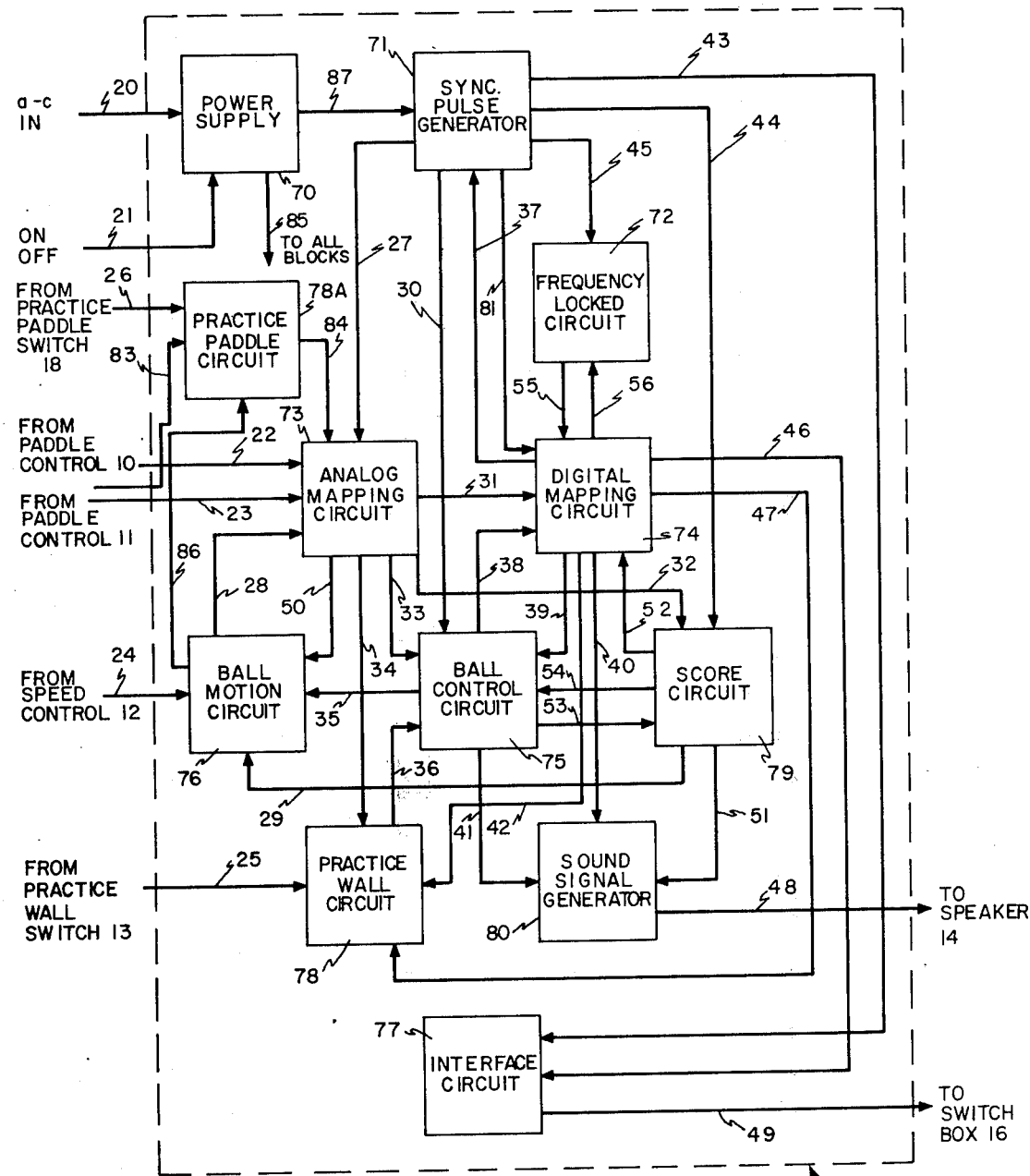
FIG. 4 is a diagrammatic representation, block diagram in form, of the electronic master controller of FIG. 1, the blocks of FIG. 4 being shown in schematic detail in later figures.

Before proceeding with a detailed description of the various interacting elements of the invention, there now follows a brief overall discussion of a general nature. The electronic game herein disclosed, as shown at 101 in FIG. 1, employs an electronic master controller 1 that introduces RF electric signals to a standard or conventional television receiver 2 to produce on the image screen (labeled 3 in FIG. 2A) of the television receiver the simulation of a playing area or other passive components of a game and the simulation of active components of a game. The television receiver 2 is one that operates within a channel allocated for television broadcasting by the Federal Communications Commission, a branch of the United States Government. While the concepts and apparatus herein disclosed have broader implications, the system described later is a simulated tennis game wherein the active components of the game include a simulated ball 5 in FIG. 2 (or some other object) that moves horizontally (i.e., the ± x-direction and vertically (i.e., the ± y-direction) and two simulated paddles 6A and 6B (there can be some other simulated object or objects whose movements are remotely and manually controlled) that move vertically (i.e., the ± y-direction) only. The passive components in FIG. 2 are the playing area shown at 4 that has a top border or boundary 4A and a bottom boundary 4B, and can have a left edge or end zone 4C and a right edge or end zone 4D, and a centerline 7. During play, the bill 5 will be deflected toward the right if it strikes the paddle 6A and toward the left if it strikes the paddle 6B; it will deflect downward if it strikes the boundary 4A and upward if it strikes the boundary 4B. For example, at the instant depicted in FIG. 2A, the ball 5 has been struck by the paddle 6B; the ball trajectory designated 8 is at some angle $\theta$ to the boundary 4A. The angle $\theta$ is the angle of incidence and, as shown, the rebound angle is also $\theta$ (within circuit tolerances). If, now, the ball 5 is struck by the simulated paddle 6A, it will rebound toward the right, and so forth, as occurs in a tennis match. As later explained with reference to FIG. 3, the rebound velocity (angle of trajectory and ball speed) from either paddle is a function of the vertical position of the paddle of impact between the paddle and the ball; so, in a sophisticated game, the ball can, in fact, be directed to strike the boundaries 4A and 4B at rather precise positions to the left or the right of the centerline 7, as the case may be. As later discussed, the paddles are electromechanically controlled to move up or down by players who have remote control over their vertical movement through paddle potentiometers 10 and 11, that is, the simulated paddles are remotely and manually controllable by a user. If a player fails to position properly and the ball is missed, it goes past the particular paddle and to the area (i.e., the end zone) behind the paddle. In the case of most television sets, the left and right edges are not visible on the screen because the face of the CRT is now wide enough; but, in fact, the master controller 1 produces electric signals which will produce the edges or ends 4C and 4D — although they do not, in fact, appear on the usual screen. Ball speed is adjustably controlled by a speed-control potentiometer 12. The embodiment depicted in FIG. 2A is intended for use by two players; the embodiment in FIG. 2B has a simulated automatic paddle 9A and a simulated wall 9B, activated by a practice paddle switch 13 in FIG. 4 and a practice wall switch 18, respectively. A speaker 14 in FIG. 1 emits a bleep when the simulated ball 5 or the like strikes a paddle or boundary to add additional realism to the game. The system 101 further includes an ON-OFF switch 15, an antenna switch box 16, and a TV antenna connector 16.

There follows now a general description of the master controller 1 with reference to FIG. 4, and that is followed by a more detailed description with reference to later figures.

In order to simplify the explanation herein the following rule relative to electrical conductor making is followed. In FIG. 4, which is a block diagram of the electronic master controller 1, elements are grouped in functional block. Interconnections to and from the master controller 1 and the internal conductors are marked 20-56, and 83-87 and appear as single lead lines (i.e., single electrical conductors), even though many of the single lines, in fact, represent more than one wire in other figures. The lead line marking is used here merely to identify its position with respect to circuit elements in the other figures: there is no need to discuss them in the text any further since they are self-explanatory (some are mentioned though), except to say that whenever a single lead line in FIG. 4 is, in fact, a plurality of leads, then the suffixes A, B, etc., are added. For example, the lead lines for "$a-c$ in" FIG. 1 are 20A and 20B since there are in fact, two leads or conductors; connection to the paddle potentiometer No. 1 is marked 22 in FIG. 4 and 22A and 22B in FIG. 1 since there are, in fact, two leads or conductors. Also, as used herein the term "coordinates" (or modifications thereof) denotes the $x$ and $y$ spatial positions of a point as measured on the image screen as a distance from the left and the top, respectively.

The master controller 1 includes a power supply 70 which changes a 60Hz 120-volt input to a d-c voltage supply (+5 volts in actual apparatus) that is connected to all the other blocks in FIG. 4 (it is the conductor marked 85 in this and in other later circuits) and to a 60 Hz, 8-volt output which is connected to a sync generator 71 and thence to the further circuitry in the controller as shown. One output from the sync generator 71 connects to a frequency locked circuit 72 and another to an analog mapping circuit 73. The frequency locked circuit 72 provides input to a digital mapping circuit 74 and receives input therefrom, as shown. The analog mapping circuit 73 provides an analog representation of the image screen 3 and the digital mapping circuit 74 provides a digital representation of the image screen 3, that is, the circuits 73 and 74 provide an analog map and a digital map, respectively, that bear time-phase relationships to the television raster-scan beam. (The two maps, as later shown, bear time-phase relationships to each other also.) In general, the active components such as the simulated ball 5, for example, are formed by messages to the CRT of the television receiver from the analog mapping circuit and the passive components such as the borderlines 4A and 4B, for example, are formed by messages from the digital mapping circuit. On the other hand, at times the two interact; such is the case for the paddles whose thicknesses (i.e., x-dimension) are determined by the digital mapping circuit and whose widths (i.e., y-dimensions) are determined by the analog mapping circuit.

It can be seen in FIG. 4 that most of the events that eventuate on the image screen of the television receiver 2 arise from messages that pass through the digital mapping circuit. Thus, by way of illustration, in FIG. 2A the ball 5 is moving upward and to the left at the instant depicted; its trajectory and speed are influenced by a ball control circuit 75 and the speed control 12 through ball motion circuitry or circuit 76 which sends ball location coordinates as one input to the analog mapping circuit. It will be noted, however, that one input, the connection labeled 39, to the ball control circuit 75 is from the digital mapping circuit 74. The interconnected circuitry acts in this way: the analog mapping circuit generates a display signal representative of the ball 5 when the raster-scan beam is at the location indicated by the ball motion circuit 76; the ball moves in the direction shown at a speed that is influenced by the speed control 12 (there is another influence on speed as a result of the interaction between the ball and the paddle, as is noted elsewhere herein); it strikes the boundary 4A and rebounds downward along the trajectory 8. Rebound is effected by the coincidence in time of display signals from the digital mapping circuit 74 and the analog mapping circuit 73, which indicated that the x-y coordinates of the boundary 4A and the ball 5 coincided; hence, a predetermined logical sequence should occur. In this instance the ball control circuit 75 inverts the signal to the ball motion circuit 76 which, in turn, inverts the rate of change of the y-coordinates of the ball. In this way, the ball 5, after coincidence with the boundary 4A, is made to move downward and to the left in FIG. 2A. This and other logical sequences and the mechanisms that effect the same are treated to varying degrees of depth in later paragraphs.

Figure 5A:
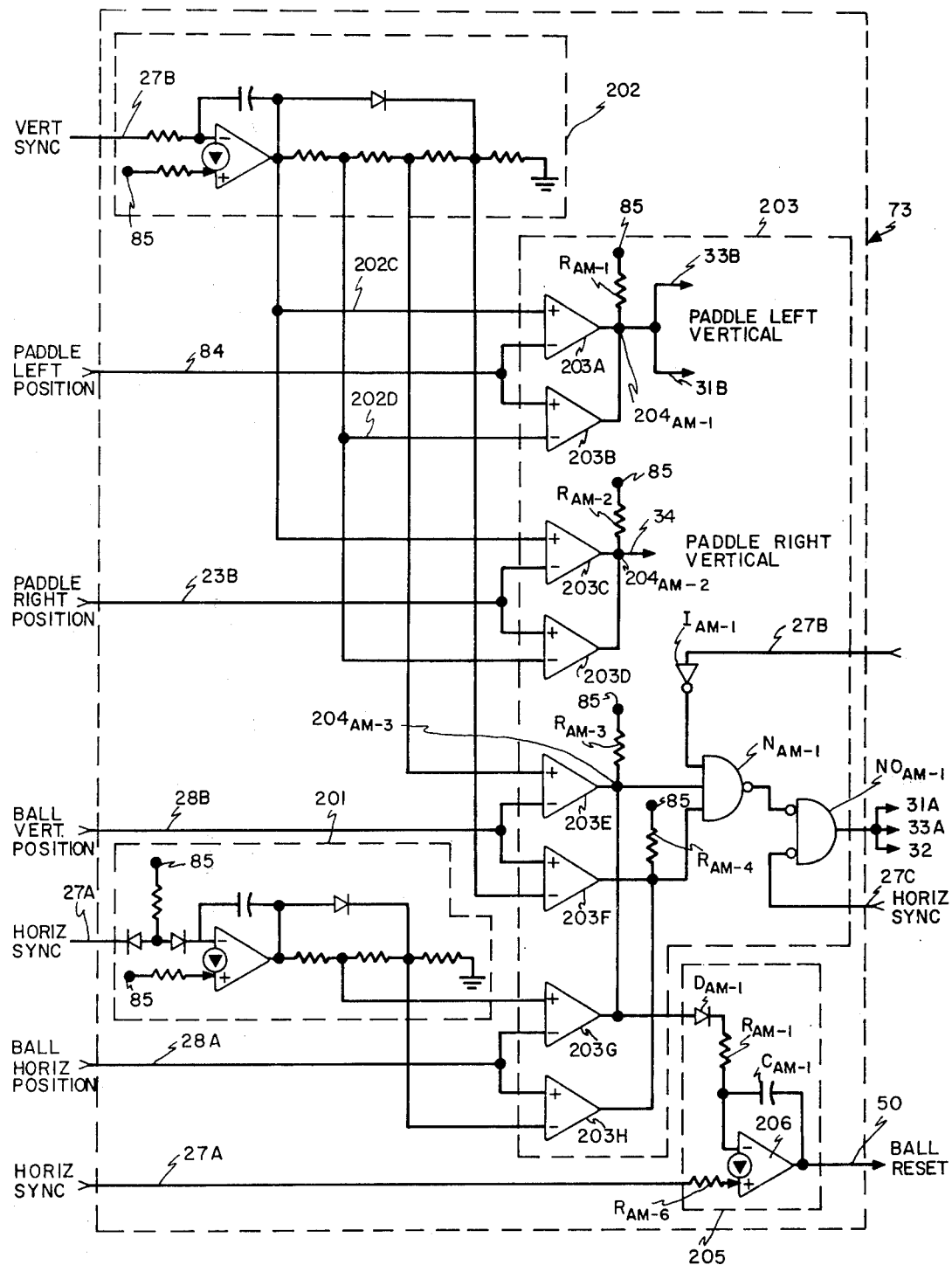
FIG. 5A shows, schematically, the analog mapping circuit shown in block diagram form in FIG. 4.

Turning now to FIG. 5A, the analog mapping circuit 73 is shown to include two ramp generators 201 and 202. The first ramp generator 201 is synchronized to produce voltage ramps 201a and 201b in FIG. 5B that have minimum values at the same time that the raster-scan beam of the television receiver 2 is at the left in FIG. 2A and is maximum when the rater-scan beam is at the right. The second ramp generator 202 is synchronized to produce second voltage ramps 202a and 202b in FIG. 5C, that have minimum values when the television receiver raster-scan beam is at one vertical end (e.g., the top) of the television screen and maximum values when the television receiver raster-scan beam is at the other vertical end (e.g., the bottom) of the television screen. In this way, the horizontal and vertical coordinates of a point (i.e., the x and y spatial location of the point) on the image screen 3 can be represented by two voltages, one on a horizontal voltage ramp (e.g., on the ramp 201a) and one on a vertical voltage ramp (e.g., on the ramp 202a) as now explained.

Figure 5B:
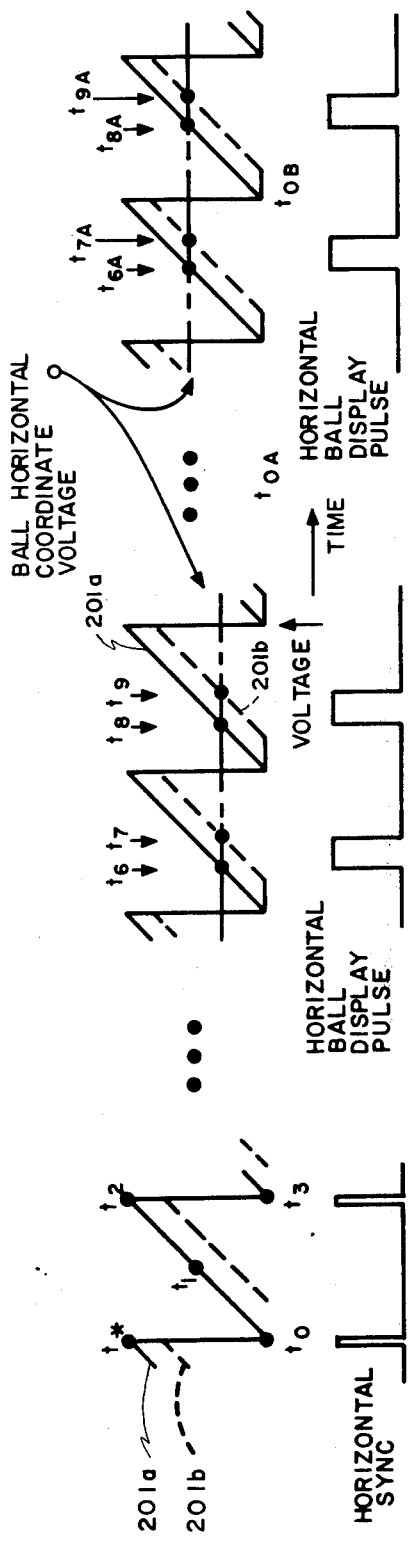
FIGS. 5B and 5C are, respectively, horizontal and vertical time-voltage sawtooth waveforms provided by the analog mapping circuit of FIG. 5A.
Figure 5C:
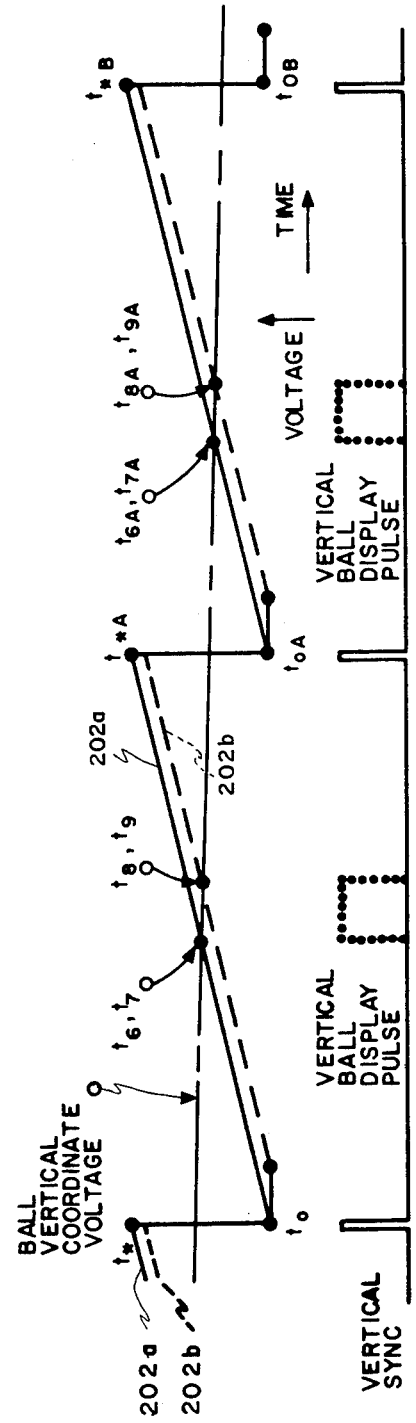
Figure 9:
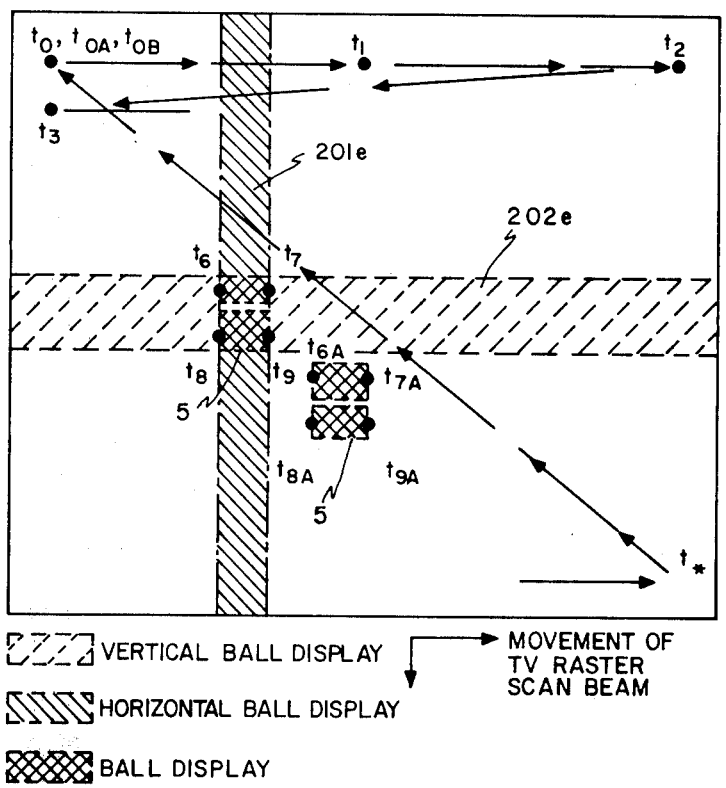
FIG. 9 represents the picture area of a television receiver cathode ray tube to show a raster scan display thereon in a time-space relationship and, in particular, to show the generation of a simulated ball on the image screen of the tube.

The explanation in this paragraph is made with reference to FIGS. 5B and 5C which show time-voltage ramps for horizontal and vertical beam modulation, respectively. Each generator, in fact, generates a pair of ramps, time-spaced or offset from one another as shown, thereby to permit generation of an area display on the screen to provide, for example, the simulated ball 5. The time-voltage ramps for horizontal control are the ramps 201a and 201b (the ramp 201b lags the ramp 201a and is shown broken). The time-voltage ramps for vertical control are the ramps 202a and 202b, the ramp 202b being shown broken and lagging. The representations in FIGS. 5B and 5C are almost self-explanatory. Briefly, the cycle of the raster-scan beam over the whole screen in FIG. 2A takes place between times $t_o$ and $t_{oA}$, $t_{oA}$ and $t_{oB}$, ect, in FIGS. 5B and 5C. Between times $t_o$ and $t_{oA}$, there are many horizontal scans and one vertical scan. A single cycle of horizontal scan occurs between $t_=$ and $t_2$ (or $t_o$ and $t_3$) in FIG. 5B, whereas a single cycle of vertical scan occurs between $t_=$ and $t_{=A}$ (or $t_o$ and $t_{oA}$) in FIG. 5C. Each scan is commenced by an appropriate sync pulse from the sync pulse generator 71. Let it be assumed, now, that the time is $t_=$, that horizontal and vertical sync pulses are applied to the ramp generators 201 and 202, respectively, in FIG. 5A, and that the ramps 201a and 202a are initiated at the lowermost ramp voltage adjacent $t_o$ in FIGS. 5B and 5C. At some $t_6$ (or $t_8$) between the times $t_o$ and $t_{oA}$, a display signal generator 203 in FIG. 5A detects that the ramp 201a has crossed the voltage level marked ball horizontal coordinate in FIG. 5B and commences a horizontal ball display pulse; at time $t_7$ (or $t_9$) the display signal generator 203 detects that the voltage ramp 201b has also crossed the ball horizontal coordinate and the ball display pulse is ended, thereby generating horizontal display pulses when the raster-scan beam in the region marked 201e in FIG. 9. A vertical display pulse in FIG. 5C is similarly generated to provide vertical display pulses when the raster-scan beam is in the region marked 202e in FIG. 9. The simulated ball is generated during the time that the raster-scan beam is within both of the regions 201e and 202e. Since the voltage ramps are linear and synchronized with the raster-scan beam by the sync pulse generator 71, a change in the voltage value of a coordinate causes the ball to move left and right in FIG. 9 or up and down, as the case may be; see the ball 5 in FIG. 9 generated between the time-space points labeled $t_{6A}$, $t_{7A}$, $t_{8A}$, and $t_{9A}$.

As is discussed elsewhere herein, the analog mapping circuit 73 also generates a vertical paddle display pulse in the same way as the vertical ball display pulse is generated: by detecting the voltage crossings of two further voltage ramps (not shown) from the ramp generator 202, the actual vertical position of the particular paddle being determined by the setting of the control potentiometer, that is, the setting of the paddle potentiometer 10 or the paddle potentiometer 11 in FIG. 1. In this way voltage ramps in the analog mapping circuit establish the length of the paddles 6A and 6B as well as the vertical position of each on the image screen 3 in FIG. 2A.

On the basis of the foregoing explanation, it can be seen that the size of the simulated ball on the television screen is determined by the magnitude of offset between the pair of horizontal ramp voltages and between the pair of vertical ramp voltages and that the horizontal and vertical velocity vectors of the simulated ball are determined by the time rate of change of these voltages.

If for some reason either the ball horizontal coordinate voltage or the ball vertical coordinate voltage exceeds the limits of the mapping ramps such that no ball signal is produced, the analog circuitry sends a reset signal to the ball motion circuitry 76 which then moves the simulated ball 5 to within the limits of the mapping ramps. The reset signal is generated by the circuitry labeled 205 in FIG. 5A which includes a Norton operational amplifier 206 used as a missing pulse detector to provide an integrated output that is rendered effective to bring the ball coordinates within the required limits whenever the ball coordinates exceed those limits. The circuitry 205 further includes a diode $D_{AM-1}$, resistors $R_{AM-5}$ and $R_{AM-6}$ and a capacitor $C_{AM-1}$.

The display signal generator 203 includes operational amplifiers or comparators 203A, 203B . . . 203H. The operational amplifiers 203A and 203B outputs are wire-ANDed to form a window comparator; in the same manner, the operational amplifiers 203C and 203D are wire-ANDed together to form a window comparator. To illustrate the functions of the display signal generator 203, either the comparator 203A or the comparator 203B holds the common output shown at $204_A$. $_{M-1}$ low whenever the paddle left position input on lead 84 is not between the actual voltages applied along leads 202C and 202D, that is, whenever the voltage ramps from the second ramp generator 202 along the leads 202C and 202D are not such as to bracket the voltage along the lead 84. The other comparator pairs 203C and 203D work in a similar fashion as to the point marked $204_{AM-2}$; and the comparators 203E . . . 203H function similarly as to the point marked $204_{AM-3}$.

It is not necessary to go into much more detail with regard to the analog mapping circuit 73 in FIG. 5A since the figure is mostly self-explanatory, but a few matters should be taken up. The ramp generators 201 and 202 each comprises an amplifier, a capacitor, a diode and resistors. The outputs are labeled in accordance with the convention previously mentioned. Resistors $R_{AM-1}$ ... between the d-c supply 85 and the common points $204_{AM-1}$ ... pulse the particular common point whenever neither comparator associated with that particular point is pulling that particular common point down.

The digital mapping circuit 74 is the digital equivalent of the analog mapping circuit 73; with reference now to FIG. 6A, it includes first and second counters 210 and 211, respectively. The first counter 210 is synchronized to produce a linear counting sequence wherein the output magnitude of count of the first counter has a minimum value when the television receiver raster-scan beam is at one horizontal end of the television screen and a maximum value when the television receiver raster-scan beam is at the other horizontal end of the television screen. The second counter 211 is synchronized to produce a linear counting sequence wherein the output magnitude of the second counter has a minimum when the television receiver raster-scan beam is at one vertical end of the television screen and a maximum value when the television receiver raster-scan beam is at the other vertical end of the television screen. Hence, the horizontal and vertical spatial coordinates of a point (i.e., the x and y spatial position or location of the point) on the image screen can be represented on a time scale by two digital addresses, one on the first counter 210 for the horizontal address and the other on the second counter 211 for the vertical address. A clock 212 is connected to establish the counting frequency of the first counter 210 and the second counter 211. The clock frequency, in turn, is controllable within small limits by a frequency locked loop that includes a frequency locked circuit 72 as well as the counters 210 and 211 and the clock 212 to adjust the rate of generation of the horizontal sync pulse and the vertical sync pulse such that they are compatible with a typical television receiver.

The inputs and outputs to the digital mapping circuit 74 are in accordance with the convention previously established. Programming of the events controlled by the circuit 74 can best be understood with reference to FIGS. 6B and 6C which respectively show timing signal outputs of the circuit 74 for horizontal control and vertical control. The timing diagrams contain some markings to indicate the purpose of some particular pulses (e.g., the centerline pulse), the the diagrams are labeled to indicate the further circuit element affected by the various signals from the circuit 74. In this connection, reference may be made to other of the figures for lead connections, etc. The combination of the analog mapping circuit with the digital mapping circuit permits fabrication of a very economical system.

Figure 6B:
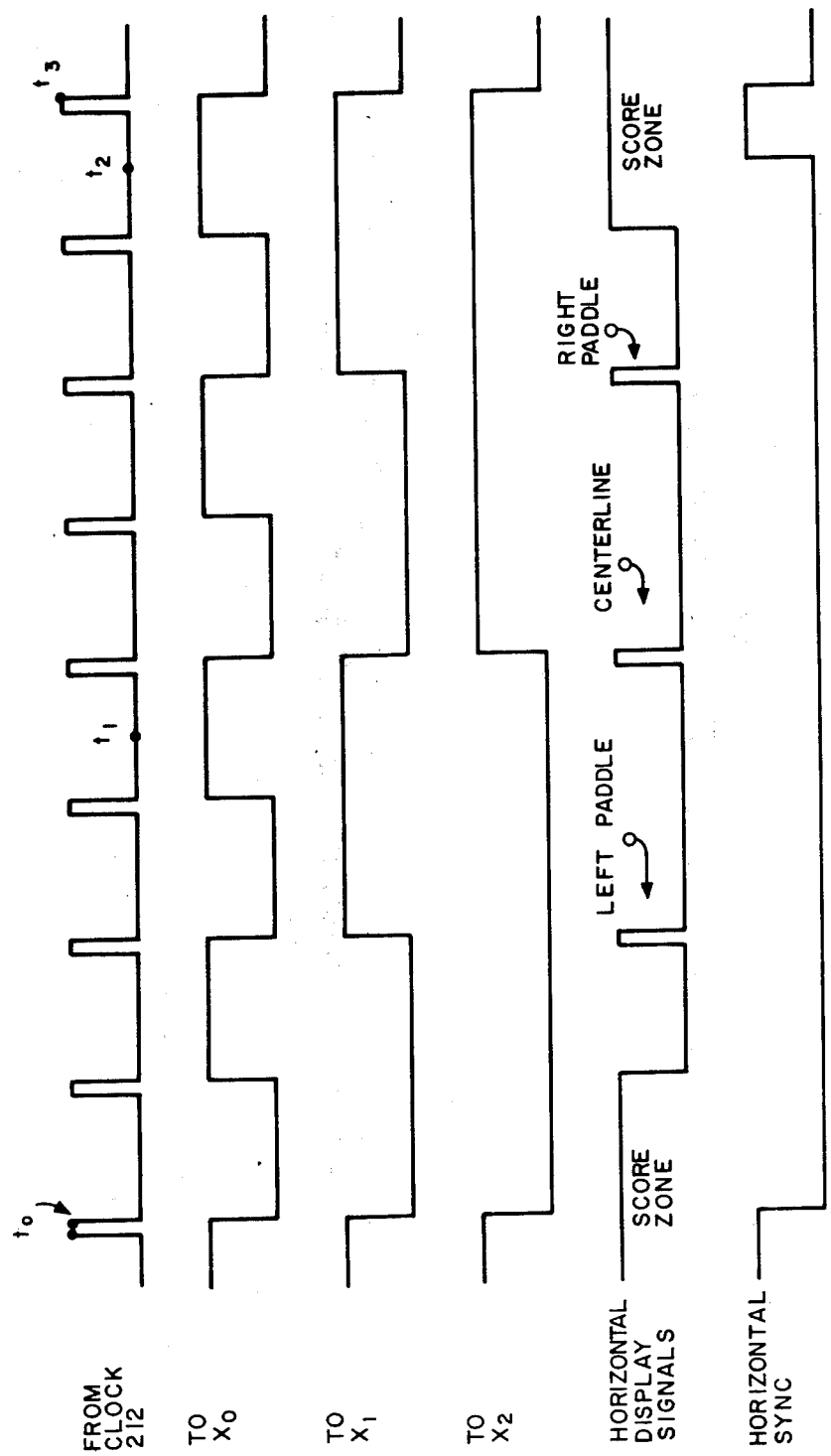
FIGS. 6B and 6C are, respectively, horizontal digital control outputs and vertical digital control outputs provided by the digital mapping circuit in FIG. 6A.
Figure 6C:
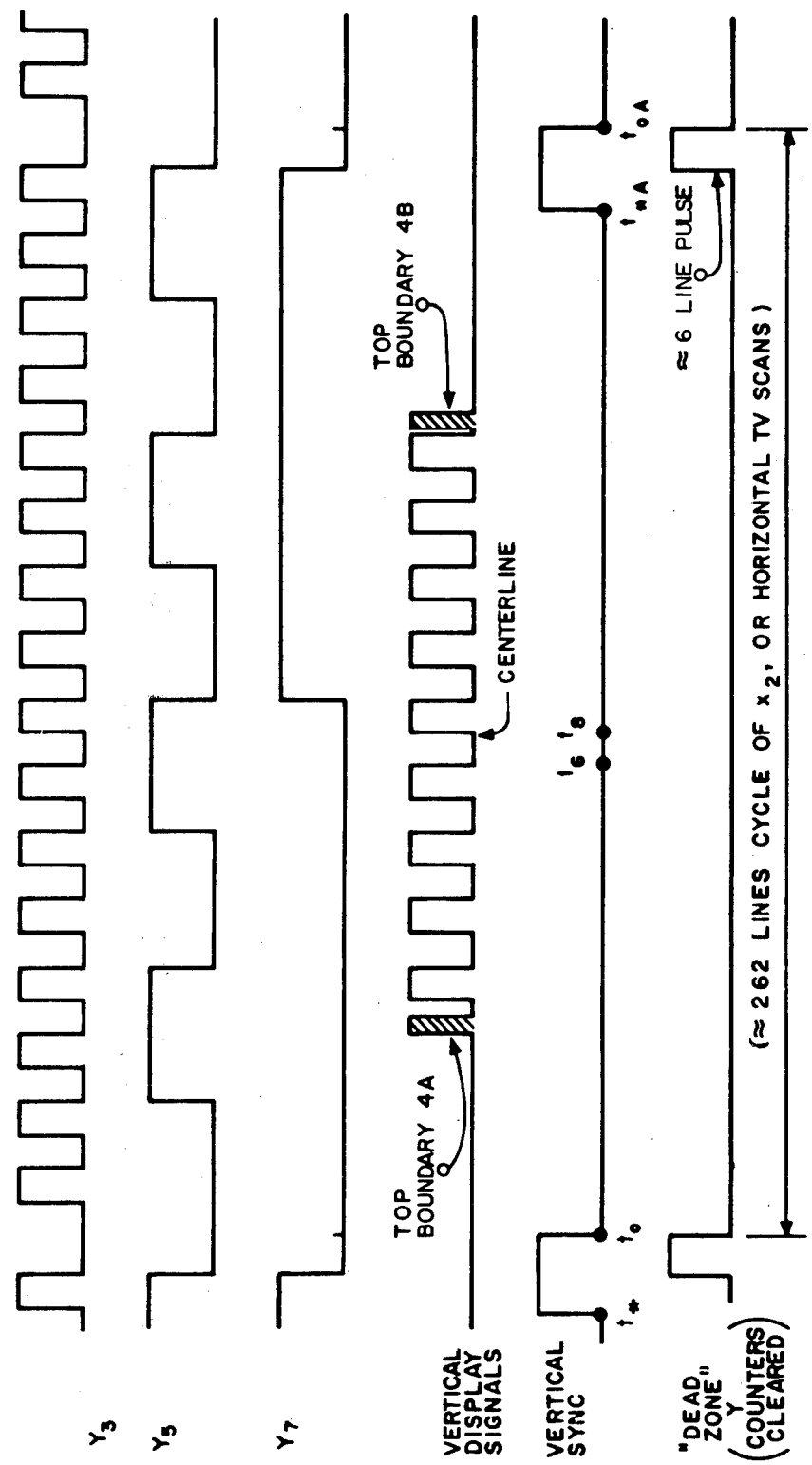
Figure 6D:
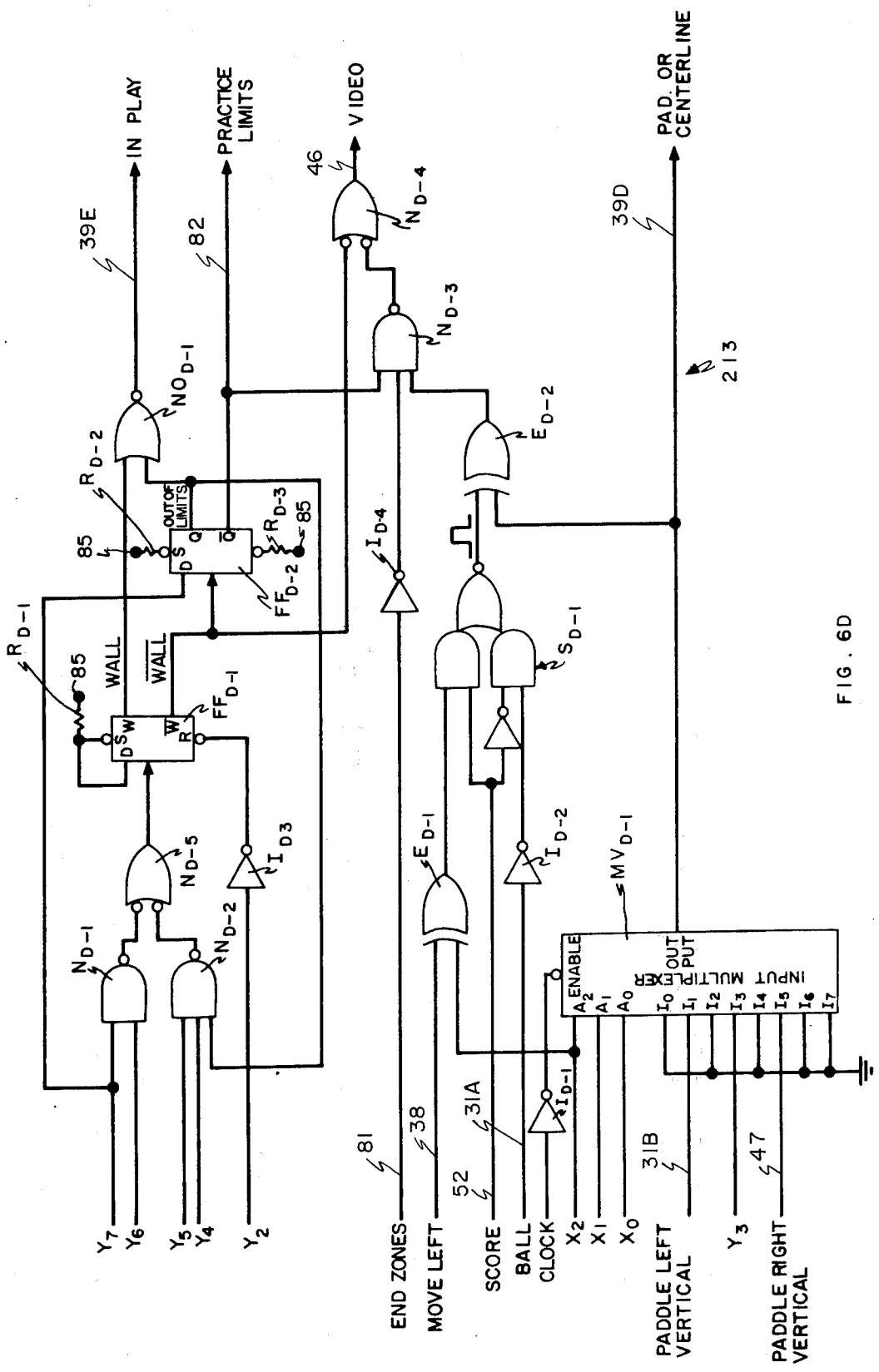
FIG. 6D is a detailed schematic of the decoding logic block of 6A.

Timing of the various signals in FIGS. 6B and 6C is controlled by inputs to decoding logic 213 in FIG. 6A from the counters 210 and 211. The decoding logic 213 serves to apply appropriate signals to the raster-scan beam; it receives signals from various external circuits, as shown, and combines those signals with inputs from the counters 210 and 211. The decoding logic 213 as shown in FIG. 6D, includes NAND gates $N_{D-1}$ ... $N_{D-5}$, and AND-OR-INVERT gate $S_{D-1}$, exclusive OR-gates $E_{D-1}$ and $E_{D-2}$, a NOR-gate $NO_{D-1}$, inverters $I_{D-1}$ ... $I_{D-4}$, resistors $R_{D-1}$ ... $R_{D-3}$, "D" flip-flops $FF_{D-1}$ and $FF_{D-2}$ and an eight input multiplexer $MV_{D-1}$.

The sync pulse generator 71, as shown in FIG. 7A, includes a horizontal sync pulse generator 220 that serves to synchronize the first ramp generator 201, the first counter 210 and the television receiver raster scan beam. In an operating system at an appropriate time, as indicated by the digital map, the horizontal sync pulse generator 220 emits a pulse which serves as one input to the analog mapping circuit 73 to return the first voltage ramps 201a and 201b in FIG. 5B to their initial voltages and which passes through an interface circuit 77 in FIG. 4 to the television receiver 2 to return the television receiver raster-scan beam to its initial horizontal location. The sync pulse generator 71 includes a vertical sync pulse generator 221 that serves to synchronize the second ramp generator 202 and the second counter 211. In the operating system and simultaneously with the similar act of the horizontal sync pulse generator 220, the vertical sync pulse generator 221 emits a pulse which serves as one input to the analog mapping circuit 73 to return the second voltage ramps 202a and 202b to their initial voltages and which passes through the interface circuit 77 to the receiver 2 to return the electron beam to its initial vertical location.

Figure 7B:
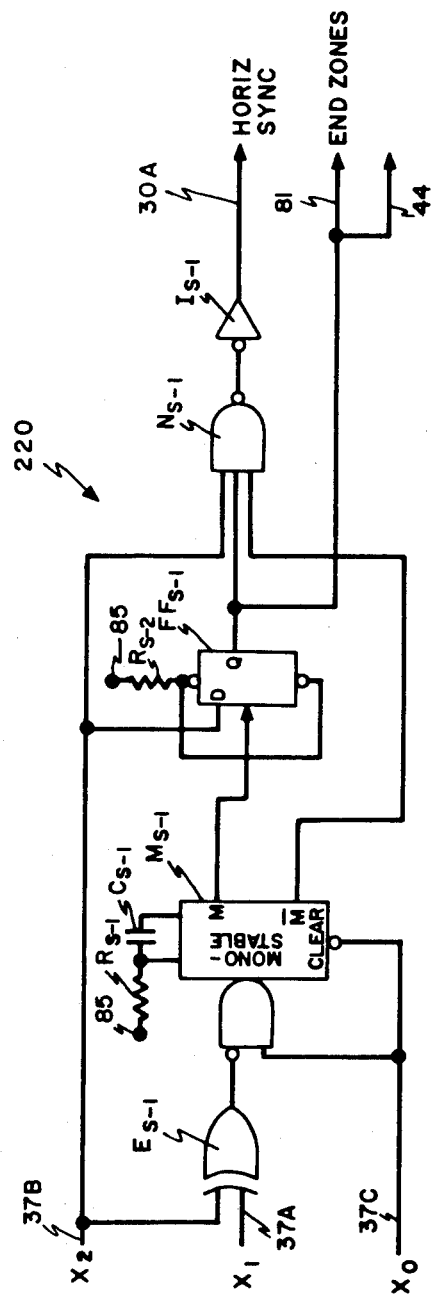
FIG. 7B shows, schematically, the horizontal sync pulse generator shown in block diagram form in FIG. 7A.

The horizontal sync pulse generator 220, as shown in FIG. 7B, comprises an exclusive OR-gate $E_{S-1}$, a monostable $M_{S-1}$, a "D" flip-flop $FF_{S-1}$, a NAND-gate $N_{S-1}$, a resistor $R_{S-1}$, and an inverter $I_{S-1}$. A resistor $R_{S-1}$ and capacitor $C_{S-1}$ serve as timing elements for the monostable $M_{S-1}$. The vertical sync pulse generator 221, as shown in FIG. 7A, comprises resistors $R_{S-3}$ ... $R_{S-9}$, capacitors $C_{S-3}$ and $C_{S-4}$, inverters $I_{S-2}$ and $I_{S-3}$ and a Norton operational amplifier $A_{S-1}$ with negative feedback.

A preferred form of frequency locked loop to provide the function required herein is the subject of a further application for Letters Patent entitled "Frequency Locked Loop" (Agans) that accompanies herewith (Ser. No. 640,106, filed Dec. 11, 1975) and that is hereby incorporated herein by reference. It is sufficient for present purposes to note that the loop serves to synchronize events within the electronic controller 1 with the television receiver raster-scan beam to assure that points on the analog map and the digital map correspond with intended locations of the beam. As before noted, the frequency locked loop includes the frequency locked circuit 72 as well as the elements 210, 211 and 212 which combine to function as a voltage controlled oscillator with a square-wave output 302 along the line marked 56 in FIG. 6A whose frequency (i.e., 1/period) is locked to the 60-cycle input frequency (i.e., 1/period) along the line 20 in FIG. 4. The necessary adjustment signal of the clock 212 to lock the periods of the two waves is provided by the circuit 72 along the line marked 55 in FIG. 6A.

Mention is made previously that the trajectory of the simulated ball 5 as it rebounds from a paddle differs, depending on the vertical position of impact on the paddle. That operation is not explained with reference mostly to FIG. 3 wherein the paddle 6A is shown to consist of eight paddle sectors $6A_1$, $6A_2$ ... $6A_8$ and to FIG. 10 which shows, in detail, the ball motion circuit 76 and which is explained further hereinafter. The ball motion circuit 76 counts the number of sectors between the point of impact on the paddle (i.e., the paddle sector struck by the simulated ball) and the bottom of the paddle to establish predetermined y-direction velocities of the ball 5. The y-direction speed of the ball 5, in the particular apparatus built, is maximum when the count is maximum or minimum, that is, when the ball hits the lowermost section $6A_8$ and the uppermost sector 6A and minimum (i.e., zero) when the count is midway between the maximum and minimum counts, that is, when the ball hits either of the sectors $6A_4$ and $6A_5$. The y-direction velocity vector, as shown in FIG. 3, is plus for the upper sectors $6A_1 \ldots 6A_3$ and minus for the lower sectors $6A_6 \ldots 6A_8$. Thus, in the exemplary system, the ball velocity, speed and direction, are functions of the sector struck.

Figure 10:
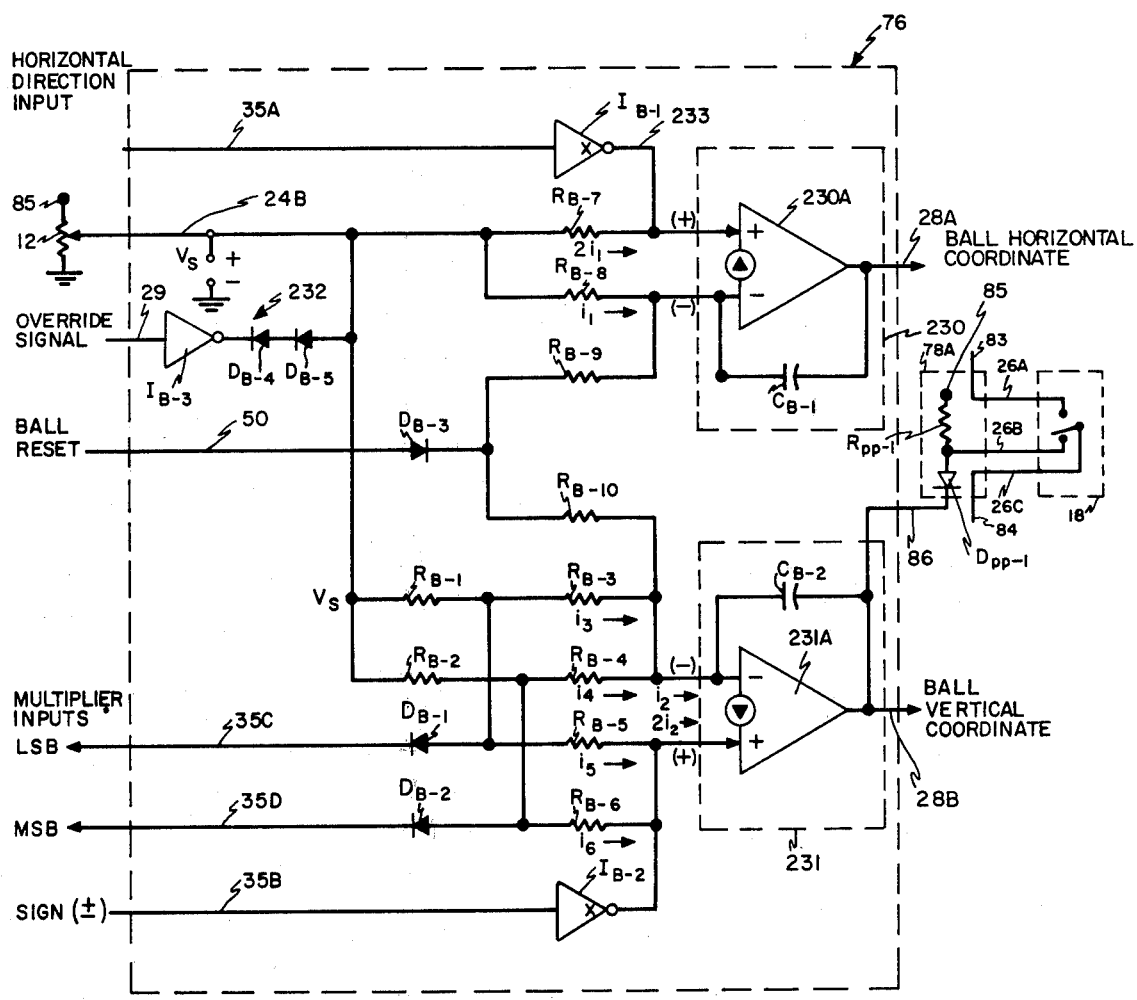
FIG. 10 shows, schematically, the ball motion circuit and the practice paddle circuit shown in block diagram form in FIG. 4 and the speed control and practice paddle switch of FIG. 1.

Turning now to FIG. 10, the ball motion circuit 76 is shown comprising a first differential integrator 230 (comprising a Norton operational amplifier 230A with negative feedback and capacitor $C_{B-1}$) and a second differential integrator 231 (comprising a Norton operational amplifier 231A with negative feedback and capacitor $C_{B-2}$). The circuit 76 further includes resistances $R_{B-1} \ldots R_{B-10}$, diodes $D_{B-1}$, $D_{B-2}$ and $D_{B-3}$, open collector inverters $I_{B-1}$ and $I_{B-2}$ and an automatic override circuit 232 (comprising an inverter $I_{B-3}$ and diodes $D_{B-4}$ and $D_{B-5}$). The resistance values chosen are such that $R_{B-1} = R_{B-2}$, $R_{B-4} = 2R_{B-5}$, $R_{B-3} = 2R_{B-5}$, $R_{B-7} = 2R_{B-8}$ and $R_{B-9} = R_{B-10} << R_{B-4}$. Let it be assumed now that the ball reset signal along the lead marked 50 is zero, i.e., there is no current through resistors $R_{B-9}$ and $R_{B-10}$. One input to the ball motion circuit 76 is a variable voltage $V_S$ from the ball speed control 12 which is, in fact, a potentiometer as shown in FIG. 10; since the voltage $V_S$ is applied through the resistances $R_{B-7}$ and $R_{B-8}$ and, further, since $R_{B-8} = 2R_{B-7}$, if the electric current through the resistance $R_{B-8}$ to the negative input (−) of the differential integrator 230 is $i$, then the current through the resistance $R_{B-7}$ to the positive input (+) to the integrator 230 is $2i$. Now a Norton operational amplifier with negative feedback will do anything to keep its input currents equal; so the output must furnish to its negative input through the capacitor $C_{B-1}$ a current sufficient to make up the difference between $i_1$ and $2i_1$, i.e., $i_1$. This can be shown to require an output voltage ramp that is the integral of $i_1$ on the capacitor $C_{B-1}$. An electrical shunting or shorting conductor 233 to the inverter $I_{B-1}$, when the electrical short is activated, carries all the current $2i$ away from the integrator, making its positive input current zero. Hence, the output is forced to drain $i_1$ amperes from the capacitor $C_{B-1}$ in order that the negative input current to the operational amplifier 230 be zero. Thus, the output voltage carried by the capacitor $C_{B-1}$ is an integral of the current $\pm i_1$ which is proportional to the setting of $V_S$, i.e., the voltage output of the potentiometer 12 which is the control means.

The second integrator 231 works similarly to the integrator 230 except that the currents marked $i_2$ and $2i_2$ are broken down into weighted parts which can be selectively shunted away from the input to the operational amplifier along electrical leads 35C and 35D. The output of the integrator 231 is the integral of the current $\pm i_2$; ergo, the derivative of that output (which determines vertical ball speed) is proportional to $V_S$ and can be multiplied by inputs MSB and LSB (which represent connections 35D and 35C that carry signals from the ball control circuit 75) which can shunt either pair of currents $i_3$ and $i_5$ (which equals $2i_3$) or $i_4$ and $i_6$ (which equals $2i_4$), thus reducing the current $i_2$ in a way dependent on the weighting of the resistance $R_{B-3}$ to $R_{B-4}$ and $R_{B-5}$ to $R_{B-6}$. In the present case, weighting is 2:1 so that binary multiplication is realized.

In mathematical terms, the current $i_2$ injected into the negative input (−) of the second integrators 231 is divided into a first summation $$\sum_{n=0}^{N} 2^n i_A$$

and the current $2i_2$ injected into the positive input (+) is divided into a second summation $$\sum_{n=0}^{N} 2^n \cdot 2i_A$$

In the circuit 76, means is provided by shunting current through the diodes $D_{B-1}$ and $D_{B-2}$ to choose any combination of terms in the first summation and the same terms in the second summation and to subtract them from the respective currents $i_2$ and $2i_2$ to affect the vertical speed of the simulated ball 5, i.e., the speed of the simulated ball takes the form $$\pm A \sum_{n=0}^{N} 2^n \cdot M_n$$

wherein $M_n$ is a multiplier input equal to zero or 1, and $A$ is proportional to $V_S$. The more general expression for the first summation is $$\sum_{n=0}^{N} a_n i_a$$

and for the second summation is $$\sum_{n=0}^{N} a_n 2i_a$$

Figure 11:
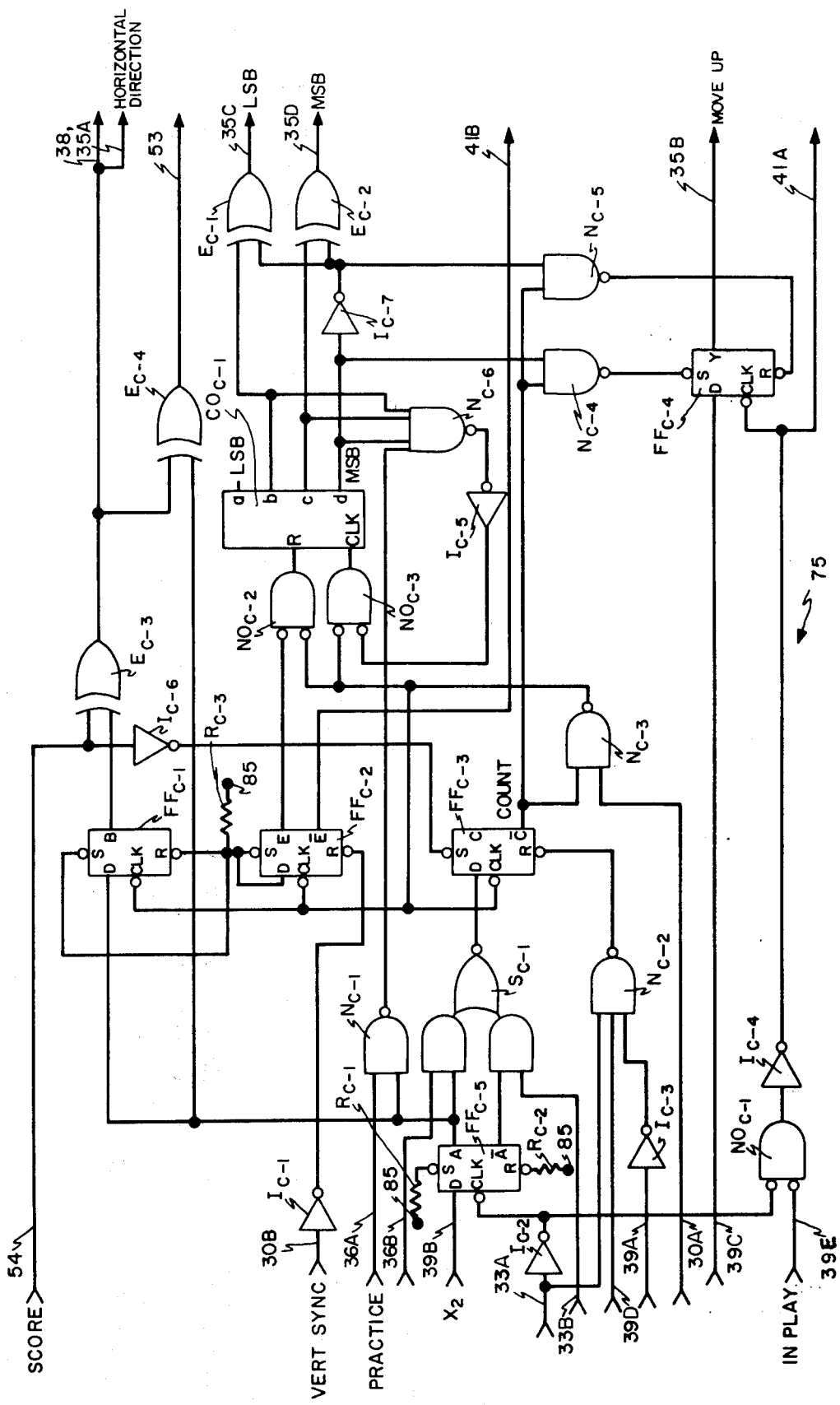
FIG. 11 is a detailed digital logic diagram of the ball control circuit shown in block diagram form in FIG. 4.

The ball control circuit 75 of FIG. 11 consists of digital logic which detects the coincidence in time of the ball display signal with the paddle display signal or the wall display signal. At the time of such an event, it looks at the output of the digital mapping circuit 74 to determine what should happen next and changes its output to affect the ball motion apparatus 76 appropriately. The outputs show up as the vertical multiplier sign (move up), MSB and LSB on conductors 35B, 35D and 35C, respectively, in FIGS. 10 and 11 and horizontal direction on input lead 35A. The circuit 75 sends a pulse to a sound signal generator 80 in FIG. 4 when any of the events just described occurs. The sound signal circuit or bleeper 80 uses the pulse to trigger a short burst of a squarewave tone or bleep from the speaker 14 in FIG. 1 when the ball coincides with (i.e., caroms from) the wall 9B in FIG. 2B or a paddle in FIGS. 2A and 2B. The circuit 75 includes NAND-gates $N_{C-1} \ldots N_{C-5}$, and AND-OR-INVERT-gate $S_{C-1}$, inverters $I_{C-1} \ldots I_{C-7}$, flip-flops $FF_{C-1} \ldots FF_{C-5}$, exclusive OR-gates $E_{C-1} \ldots E_{C-4}$, and a counter $CO_{C-1}$. Resistors $R_{C-1} \ldots R_{C-3}$ again modify the voltage of the d-c supply 85.

Figure 12:
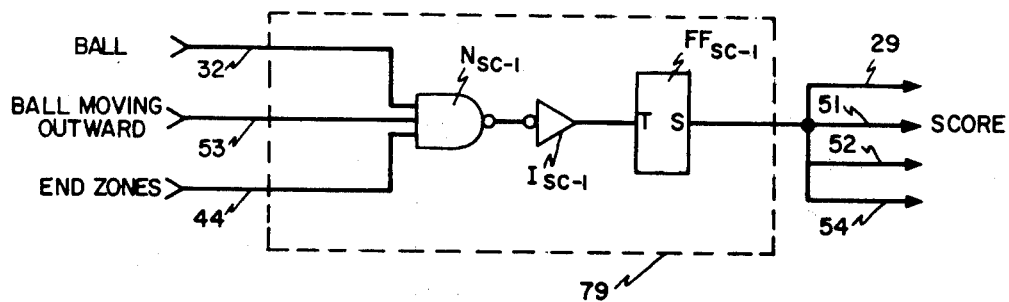
FIG. 12 is a detailed digital logic diagram of the score circuit shown in block diagram form in FIG. 4.

The score circuit 79, as shown in FIG. 12, includes a three-input NAND-gate $N_{SC-1}$ to detect the coincidence of the simulated ball 5 and one or the other of the end zones 4C and 4D and the fact that the simulated ball is moving away from the centerline 7. When that sequence of events occurs, a signal is sent by the gate $N_{SC-1}$ through an inverter $I_{SC-1}$ to a "T" flip-flop $FF_{SC-1}$. $FF_{SC-1}$ at this juncture changes from zero to 1 which causes several further things to happen: (1) the 1 signal from the flip-flop $FF_{SC-1}$ activates the override 232 in the ball motion circuit 76 of FIG. 10 which forcibly (by pulling down through the diodes $D_{B-4}$ and $D_{b-5}$) sets the ball speed to a low value, (2) energizes the bleeper circuit 80, (3) sends a signal to the ball control circuit 75 in FIG. 11 to (a) prevent the ball from hitting either paddle and (b) reverse the horizontal direction of the ball, and (4) signals the digital mapping circuit of FIG. 6A to prevent display of the ball 5 and to lighr up the side of the image screen where the ball was missed (by inverting black-white). The ball, then moves slowly and invisibly, back to the other score area (i.e., end zone) and, since the ball is again moving away from the centerline 7, the flip-flow $FF_{SC-1}$ is again toggled (from 1 to zero in the situation discussed in this paragraph); the ball now moves back toward the paddle that last missed from the end zone opposite that paddle (i.e., the ball is served).

Figure 13:
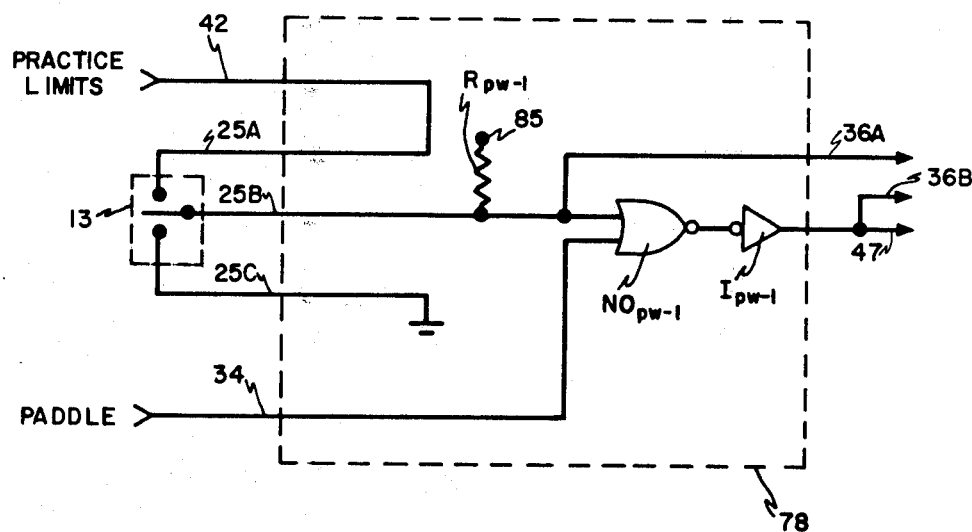
FIG. 13 is a detailed logic diagram of the practice wall circuitry shown in block diagram form in FIG. 4 and further includes the practice wall switch shown in block diagram form in FIG. 1.

The function of the practice wall circuit labeled 78 in FIGS. 4 and 13 is to switch OFF the user paddle 6B and to introduce an automatic paddle 9B in FIG. 2B that extends the entire distance from the top border 4A to the bottom border 4B; the automatic paddle 9B serves as a practice wall to intercept the ball at any intermediate point between the borders and return it in the direction of the centerline 7. At the same time, the practice circuit 78 effects changes in the ball control circuit 75 to cause the wall 9B to direct the ball as if the ball were hitting one of many normal paddles stacked end-to-end, rather than a large one, i.e., the wall 9B has many sets of eight sectors, like the sectors in FIG. 3.

The circuit 78 comprises a NOR-gate $NO_{pw-1}$ and an inverter $I_{pw-1}$. The resistor labeled $R_{pw-1}$, as before, is a pull-up resistance between the d-c supply 85 and one input to the NOR-gate $NO_{pw-1}$.

The function of the practice paddle circuit marked 78A in FIGS. 4 and 10 is to cut off user control of the left paddle 6A in FIG. 2B and to generate an automatic paddle 9A which is positioned automatically such that it intercepts the simulated ball 5. By introducing both the practice wall circuit 78 and the practice paddle circuit 78A, the operation is rendered automatic, i.e., independent of any user or player. It is employed mostly as a sales display aid. The practice paddle circuit 78A comprises a diode $D_{pp-1}$ and a resistor $R_{pp-1}$. Changing operation from user control to automatic control is accomplished by the two-position switch 18; when the switch 18 is closed on the conductor 26A, user control of the paddle 9A is in effect, and when the switch 18 is closed on the conductor 26B, automatic control is in effect.

Figure 8:
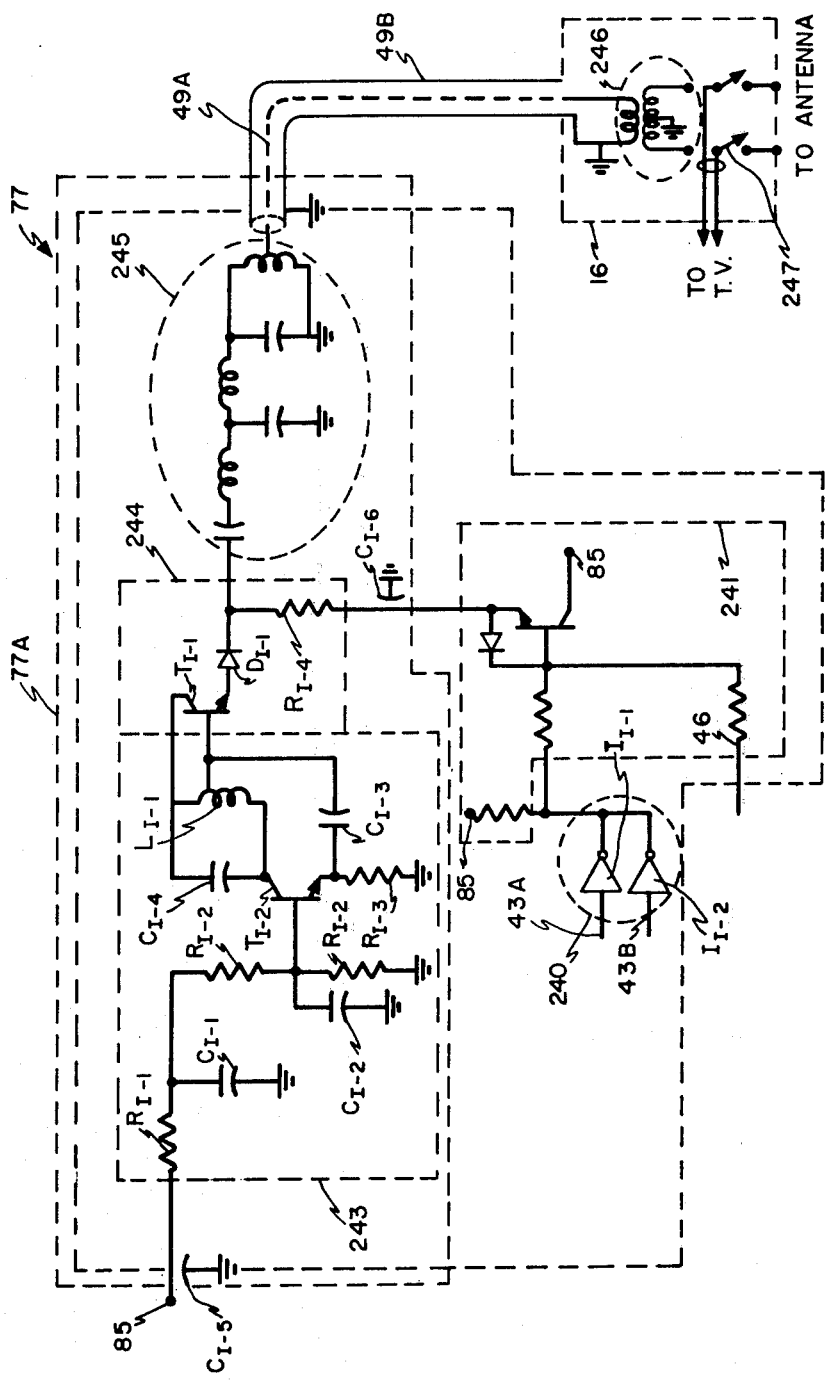
FIG. 8 shows, schematically, the interface circuit shown in block diagram form in FIG. 4 as well as the antenna switch box circuit shown in block diagram form in FIG. 1.

The output from the electronic controller 1 passes through the interface circuit 77 shown in detail in FIG. 8 comprising an amplifier 240, an adder 241, a multiplier 244 and an internal oscillator 243. Briefly, the circuit 77 receives as input sync pulses at input leads 43A and 43B and a video pulse at input lead 46. The sync pulses are amplified and combined with the video pulse in the adder 241 whose output is multiplied by the multiplier 244 with a signal from the internal oscillator 243 to provide a controller 1 output that is connected along leads 49A and 49B to the switch box 16 and thence to the video amplifier of the television receiver, as shown in FIG. 1. The output of the interface 77 is filtered by an output filter 245, as shown. The leads 49A and 49B are, in fact, a coaxial cable to provide RF shielding to prevent noise transmission, and the elements within the broken line 77A in FIG. 8 are shielded for the same reason. The internal oscillator 243 comprises resistors $R_{I-1} \ldots R_{I-3}$, capacitors $C_{I-1} \ldots C_{I-4}$, a transistor $T_{I-2}$, and a tunable coil $L_{I-1}$; the multiplier 244 comprises a transistor $T_{I-1}$ a diode $D_{I-1}$ and a resistor $R_{I-4}$; and the multiplier 240 comprises inverter-amplifiers $I_{I-1}$ and $I_{I-2}$. Capacitors $C_{I-5}$ and $C_{I-6}$ are shielding capacitors.

The antenna switch box 16 in FIG. 1, as shown in FIG. 8, comprises a matching balun 246 and a double-pole, double-throw switch 247. The elements labeled 16 in FIG. 8, in actual apparatus, are found within a metal box to satisfy FCC requirements. Connection to the television receiver 2 of the RF signal from the controller 1 can be hard-wire or electromagnetic coupling, i.e., wireless.

The system of the present invention permits production of apparatus that is, relatively speaking, inexpensive both in terms of the number and cost of parts used and in the assembling thereof—yet reliable. Thus, for example, by using analog circuitry to define horizontal ball movement, it is necessary to count, in the digital circuit, only eight times per scan, rather than the 256 times per scan that would otherwise be needed. This saves on the cost of the oscillator needed as well as in the shielding that is required for the 4 MHz clock that is needed in the higher-count system. Also, the present system with the Norton operational amplifiers in the ball motion circuit 76, combined with appropriate digital logic, gives a great deal of flexibility to achieve low cost: by way of illustration, the combination just mentioned replaces many counters, flip-flops, and gates in a comparable all-digital system. Furthermore, and as noted in said patent application, the design herein eliminates the need for production trimming.

Further modifications of the invention herein described will occur to persons skilled in the art and all such modifications are deemed to be within the spirit and the scope of the present invention as defined by the appended claims.

What is claim is:

1. Playing apparatus that comprises, in combination: a television receiver that operates within a channel allocated for television broadcasting; and electronic control means adapted to produce on the image screen of the television receiver the simulation of at least part of a playing area and the simulation of active components of a game, said electronic control means comprising comparator means that serves to locate the horizontal and vertical coordinates of a point, that is, the $x$ and $y$ spatial location of the point, on the image screen, said comparator means comprising a first pair of comparators that act in combination to locate the horizontal coordinate of the point and a second pair of comparators that act in combination to locate the vertical coordinate of the point.

2. Playing apparatus as claimed in claim 1 wherein said electronic control means comprises analog mapping circuitry and digital circuitry, and wherein the comparator means is part of the analog circuitry.

3. Playing apparatus as claimed in claim 1 in which the playing area is an elongate area that includes top and bottom boundaries and in which the active components comprises at least one simulated object whose movement on the image screen is remotely and manually controllable.

4. Playing apparatus as claimed in claim 3 in which the at least one simulated object comprises a first simulated paddle disposed at one end of the playing area and a second simulated paddle disposed at the opposite end of the playing area, means being provided to render each paddle movable transversely between said boundaries under the remote control of a player and through said electronic control means.

5. Playing apparatus as claimed in claim 4 in which one of said active components is a simulated ball which is produced under the direction of the electronic control means and which is caused to move within the playing area under the automatic direction of the electronic control means.

6. Playing apparatus as claimed in claim 5 in which the first and second simulated paddles and the boundaries deflect the simulated ball, the movement of the ball between deflections being independent and automatic in its motion.

7. Playing apparatus as claimed in claim 6 wherein the velocity of the simulated ball in its movement has a horizontal component and a vertical component, each of the components being independently alterable by the electronic control means.

8. Playing apparatus as claimed in claim 7 in which the vertical component of motion is a function of the position of incident between the simulated ball and the simulated paddle struck relative to the simulated paddle until the simulated ball again strikes a paddle.

9. Playing apparatus as claimed in claim 6 in which the electronic control means includes means to change the speed of travel of the simulated ball.

10. Playing apparatus as claimed in claim 6 in which in the event that one or the other of the simulated paddles fails to deflect the simulated ball in the direction of the opposite end of the playing area, then the electronic control means acts to indicate for a predetermined period of time, on the television screen, which paddle failed to deflect the simulated ball.

11. Playing apparatus as claimed in claim 6 in which the electronic control means includes means to inhibit display of the ball during said period of time.

12. Playing apparatus as claimed in claim 1 that includes means to produce a practice obstacle of at least one of said active components.

13. Playing apparatus as claimed in claim 1 having means to produce sound at significant times during the course of play as an aspect of simulation of actual events.

14. Playing apparatus as claimed in claim 1 wherein the electronic control means includes means to generate an analog map of the image screen of the television receiver and means to generate a digital map of said image screen, that bear time-phase relationships to the raster-scan beam and to each other, said comparator means being part of the means to generate an analog map.

15. Playing apparatus as claimed in claim 14 which further includes means to combine data from the analog map with data from the digital map to produce a signal that is connected to the television receiver to produce on the image screen the simulation of a playing area and the simulation of active components of a game.

16. Playing apparatus as claimed in claim 14 wherein the means to generate an analog map includes two ramp generators, the first ramp generator being synchronized to produce a voltage ramp that has a minimum value when the television receiver raster-scan beam is at one horizontal end of the television screen and a maximum value when the television receiver raster-scan beam is at the other horizontal end of the television screen and the second ramp generator being synchronized to produce a second voltage ramp that has a minimum value when the television receiver raster-scan is at one vertical end of the television screen and a maximum value when the television receiver raster-scan beam is at the other vertical end of the television image screen such that the horizontal and vertical coordinates of a point on the image screen can be represented by two voltages, one referenced to the first voltage ramp and the other reference to the second voltage ramp, and wherein the means to generate a digital map comprises means for providing digital addresses that includes two counters, the first counter being synchronized to produce a linear counting sequence wherein the output magnitude of the first counter has a minimum value when the television receiver raster-scan beam is at one horizontal end of the television screen and a maximum value when the television receiver raster-scan beam is at the other horizontal end of the television screen and the second counter being synchronized to produce a linear counting sequence wherein the output magnitude of the second counter has a minimum when the television receiver rast-scan beam is at one vertical end of the television screen and a maximum value when the television receiver raster-scan beam is at the other vertical end of the television screen such that the horizontal and vertical coordinates of a point on the image screen can be represented by two digital addresses.

17. Playing apparatus as claimed in claim 16 that includes first means to synchronize the first ramp generator and the first counter with the television receiver raster-scan beam, said first means to synchronize comprising a horizontal sync pulse generator which at a particular digital address of the first counter provides a pulse that acts to return the first voltage ramp to its initial voltage and transmits a horizontal sync pulse to the television receiver to return the television receiver raster-scan beam to its initial horizontal location.

18. Playing apparatus as claimed in claim 17 that includes second means to synchronize the second generator counter with the television receiver raster-scan beam, said second means to synchronize comprising a vertical sync pulse generator which, at a particular phase angle of the incoming a-c current that powers the apparatus, generates a pulse that returns the second voltage ramp to its initial voltage, returns the second counter to its initial output magnitude and trasmits a vertical sync pulse to the television receiver to return the television receiver raster-scan beam to its initial vertical location.

19. Playing apparatus as claimed in claim 18 that includes a clock connected to control counting frequency of both the first counter and the second counter and that further includes a frequency locked circuit that controls the clock frequency within small limits to adjust the rate of generation of the horizontal sync pulse and the vertical sync pulse such that they are compatible with a typical television receiver.

20. Playing apparatus as claimed in claim 16 that further includes means to initiate a first display signal when the television raster-scan beam is at any particular horizontal coordinate and terminate the first display signal when the television raster-scan beam has moved a predetermined horizontal distance and that further includes means to initiate a second display signal when the television raster-scan beam is at any paticular vertical coordinate and terminate the second display signal when the television raster-scan beam has moved a predetermined vertical distance, thereby determining the location and size of the ball and the vertical location and vertical size of the paddles.

21. Playing apparatus as claimed in claim 1 wherein one of said active components is a simulate object, wherein the electronic control means includes means to establish an analog map which is directly related to the screen of the television receiver and wherein analog voltages correspond to horizontal and vertical positions on the television screen, said analog map including sad comparator means.

22. Playing apparatus as claimed in claim 21 wherein the electronic control means further includes means to establish a pair of voltages corresponding to the coordinates of the simulated object on said analog map.

23. Playing apparatus as claimed in claim 22 wherein the means to establish an analog map includes offset means to generate a small area of fixed size about the coordinates of the simulated object, which area corresponds to the area of the simulated object on the television screen.

24. Playing apparatus as claimed in claim 24 wherein the offset means comprises two ramp generators each of which generates a pair of offset waveforms, one pair of the offset waveforms serving to determine the vertical limits of the simulated object and the other pair of offset waveforms serving to determine the horizontal limits of the simulated object, said one pair of offset waveforms being connected as input to the first pair of comparators and said other pair of offset waveforms being connected as input to the second pair of comparators.

25. Playing apparatus as claimed wherein the manually controllable voltage source includes an automatic override that acts selectively to effect a change in the speed of the simulated ball independent of the manual setting of the manually controllable voltage source.

26. Playing apparatus as claimed in claim 1 wherein one of said active components is a simulated object and wherein the electronic control means includes control circuitry, including said comparator means, which automatically effects motion of the simulated object on the screen of the television receiver by changing the horizontal and vertical coordinates of the object.

27. Playing apparatus as claimed in claim 26 in which the control circuitry includes a first integrator having a voltage output whose instantaneous value is the electric analog of the horizontal coordinate and a second integrator having a voltage output whose instantaneous value is the electric analog of the vertical coordinate.

28. Playing apparatus as claimed in claim 27 in which the control circuitry includes a hybrid combination of digital circuitry and analog circuitry that interact to vary both the direction and rate of integration of both the first integrator and the second integrator to effect said motion.

29. Playing apparatus as claimed in claim 27 where the first integrator and the second integrator each comprises a capacitor and a Norton operational amplifier and wherein the operational amplifier charges and discharges the capacitor at a rate proportional to the difference between the two input currents to the respective integrator.

30. Playing apparatus as claimed in claim 29 having means to inject a current $i_2$ into the negative input of the second integrator and to inject a current $2i_2$ into the positive input of the second integrators and having means selectively to shunt the current $2i_2$ away from the positive input of the second integrator.

31. Playing apparatus as claimed in claim 30 that includes means to provide a digital signal and wherein the means to shunt comprises an open collector inverter controlled by the digital signal, which inverter acts to control the direction of movement of the simulated ball in the vertical direction, that is, the inverter serves to determine whether the ball moves up or down on the television screen.

32. Playing apparatus as claimed in claim 30 wherein the means to inject the current $i_2$ into the negative input comprises means to divide the current $i_2$ into a first summation $$\sum_{n=0}^{N} 2^n i_A$$

and the means to inject the current $2i_2$ into the positive input comprises means to divide the current into a second summation $$\sum_{n=0}^{N} 2^n \cdot 2i_A$$

33. Playing apparatus as claimed in claim 32 that includes means to choose any combination of terms of the first summation and the same combination of terms of the second summation and to subtract them from the respective currents $i_2$ and $2i_2$ thereby to affect the vertical speed of the simulated ball.

34. Playing apparatus as claimed in claim 32 wherein the means to inject the current $i_2$ into the negative input comprises means to divide the current $i_2$ into a first summation $$\sum_{n=1}^{N} A_n i_A$$

and the means to inject the current $2i_2$ into the positive input comprises means to divide the current $2i_2$ into a second summation $$\sum_{n=1}^{N} A_A \cdot 2i_A$$

35. Playing apparatus as claimed in claim 34 that includes means to choose any combination of terms of the first summation and the same combination of terms of the second summation and to subtract them from the respective currents $i_2$ and $2i_2$ thereby to affect the vertical speed of the simulated ball.

36. Playing apparatus as claimed in claim 27 having means to inject a current $i$, into the negative input of the first integrator and to inject a current $2i_1$ into the positive input of the first integrator and having means selectively to shunt the current $2i_1$ away from the positive input of the first integrator.

37. Playing apparatus as claimed in claim 36 that includes means to provide a digital signal and wherein the means to shunt comprises an open collector inverter controlled by a digital signal, which inverter acts to control the direction of movement of the simulated ball in the horizontal direction, that is, the inverter serves to determine whether the ball moves to the left or to the right on the television screen.

38. Playing apparatus as claimed in claim 36 that further includes a manually controllable voltage source and resistances $R_1$ and $2R_2$, wherein $R_1 = R_2$, that serve, in combination, as a variable current dual-current source supplying the currents $i_1$ and $2i_1$ to the integrator.

39. Playing apparatus as claimed in claim 1 wherein said first pair of comparators comprises two comparators whose outputs are ANDed together to form a first window comparator and said second pair of comparators comprises two comparators whose outputs are ANDed together to form a second window comparator to provide electronic control means comprising a plurality of window comparators.

40. Playing apparatus as claimed in claim 39 in which the active components comprise a simulated ball produced by the two window comparators and caused to move within the playing area under the control of the electronic control means acting through said two window comparators.

41. Playing apparatus as claimed in claim 40 that comprises ramp generator means comprising two ramp generators, the first ramp generator being synchronized to produce offset voltage ramps that have minimum values when the raster-scan beam of the television receiver is reset to its starting horizontal coordinate and maximum when the raster-scan beam is at its final horizontal coordinate and the second ramp generator being synchronized to produce offset voltage ramps that have minimum values when the raster-scan beam of the television receiver is reset to its starting vertical coordinate and maximum when the raster scan beam is at its final vertical coordinate.

42. Playing apparatus as claimed in claim 40 that includes ramp generator means operable to generate a horizontal ramp and a vertical ramp, one of the window comparators of the two window comparators being connected to receive the horizontal ramp and the other of the window comparators of the two window comparators being connected to receive the vertical ramp, the window comparators and the ramp generator means acting in combination to generate the ball as an area display on the image screen and to move the ball smoothly about the image screen.

43. Playing apparatus as claimed in claim 1 that includes analog mapping means, digital mapping means, and a frequency locked loop that serves to synchronize events in the analog mapping means with events in the digital mapping means.

44. Playing apparatus as claimed in claim 43 wherein the digital mapping means comprises an input multiplexer which serves to decode the digital mapping means and to display objects on the image screen at appropriate locations of the television receiver raster-scan beam.

45. Playing apparatus as claimed in claim 44 wherein the digital mapping means comprises a first counter and a second counter that serve in combination to locate horizontal and vertical spatial coordinates of a point on the image screen.

46. For use in a system that includes a television receiver, electronic control means operative to produce on the screen of the television receiver the simulation of at least part of a playing area and the simulation of active components of a game, said electronic control means comprising analog mapping circuit means and digital means that act together to produce said components, said analog mapping circuit comprising comparator means that serves to locate the horizontal spatial coordinate and the vertical spatial coordinate of a point on the image screen, said comparator means comprising one pair of comparators that interact to locate the horizontal coordinate and another pair of comparators that interact to locate the vertical coordinate, each pair comprising two comparators whose outputs are ANDed together.

47. Electronic control means as claimed in claim 46 wherein said digital means is digital mapping circuit means.

48. An electronic controller for a cathode ray tube that operates in a raster-scan mode that comprises, in combination, means to generate an analog map including two ramp generators, the first ramp generator being synchronized to produce a voltage ramp that has a minimum value when the raster-scan beam of the tube is at one horizontal end of the image screen of the tube and a maximum value when the raster-scan beam is at the other horizontal end of the image screen and the second ramp generator being synchronized to produce a second voltage ramp that has a minimum value when the raster-scan beam is at one vertical end of the screen and a maximum value when the raster-scan beam is at the other vertical end of the screen such that the horizontal and vertical coordinates of a point on the image screen can be represented by two voltages, one referenced to the first voltage ramp and the other referenced to the second voltage ramp; means to generate a digital map that includes two counters, the first counter being synchronized to produce a linear counting sequence wherein the output magnitude of the first counter has a minimum value when the raster-scan beam is at one horizontal end of the image screen and a maximum value when the raster-scan beam is at the other horizontal end of the image screen and the second counter being synchronized to produce a linear counting sequence wherein the output magnitude of the second counter has a minimum when the raster-scan beam is at one vertical end of the image screen and a maximum value when the raster-scan beam is at the other vertical end of the image screen such that the horizontal and vertical coordinates of a point on the image screen can be represented by two digital addresses, one address of the two being a count on the first counter and the other address being a count on the second counter; the analog map and the digital map bearing a time-phase relationship to the raster-scan beam and to each other; and means connected to the generators for providing synchronization.

49. An electronic controller as claimed in claim 48 that further includes comparator means that serves to locate the horizontal spatial coordinate of a point and the vertical spatial coordinate of a point on the image screen of the cathode ray tube, said comparator means comprising one pair of comparators that interact to locate the horizontal coordinate of the point and another pair of comparators that interact to locate the vertical coordinate, each pair comprising two comparators whose outputs are ANDed together, said first ramp generator being connected as input to the first-named pair of comparators and the second ramp generator being connected as input to the second-named pair of comparators.

* * * * *